(12) United States Patent
Choi et al.

(10) Patent No.: US 7,784,955 B2
(45) Date of Patent: Aug. 31, 2010

(54) APPARATUS FOR AIMING LED HEADLAMP

(75) Inventors: Sung Uk Choi, Hwaseong-si (KR); Se Wook Oh, Gunpo-si (KR); Joung Hyun Joo, Pusan (KR)

(73) Assignee: Hyundai Motor Company, Seoul (KR)

( * ) Notice: Subject to any disclaimer, the term of this patent is extended or adjusted under 35 U.S.C. 154(b) by 96 days.

(21) Appl. No.: 12/192,865

(22) Filed: Aug. 15, 2008

(65) Prior Publication Data

US 2009/0154190 A1 Jun. 18, 2009

(30) Foreign Application Priority Data

Dec. 14, 2007 (KR) .................... 10-2007-0130999

(51) Int. Cl.
*B60Q 1/12* (2006.01)
*G01B 5/00* (2006.01)

(52) U.S. Cl. .................... 362/37; 362/43; 362/460; 362/507

(58) Field of Classification Search ............ 362/37, 362/39, 40, 43, 45, 460, 469, 507
See application file for complete search history.

(56) References Cited

U.S. PATENT DOCUMENTS

| 6,231,220 | B1* | 5/2001 | Shibuya et al. | 362/507 |
|---|---|---|---|---|
| 6,547,427 | B1* | 4/2003 | Cheron et al. | 362/507 |
| 7,237,936 | B1 | 7/2007 | Gibson | |
| 2002/0191413 | A1* | 12/2002 | Hayakawa et al. | 362/544 |
| 2003/0039124 | A1* | 2/2003 | Tawa et al. | 362/464 |
| 2003/0103358 | A1* | 6/2003 | Tatsukawa et al. | 362/539 |
| 2004/0202007 | A1* | 10/2004 | Yagi et al. | 362/545 |
| 2006/0215416 | A1* | 9/2006 | Lucas et al. | 362/545 |
| 2008/0130301 | A1* | 6/2008 | Kusagaya | 362/466 |

FOREIGN PATENT DOCUMENTS

JP 2004-276740 10/2004

\* cited by examiner

*Primary Examiner*—Jacob Y Choi
(74) *Attorney, Agent, or Firm*—Morgan, Lewis & Bockius LLP

(57) ABSTRACT

Disclosed herein is an LED (light emitting diode) headlamp aiming apparatus, which aims a mounting module that is provided with LEDs and is installed in a headlamp housing. The LED headlamp aiming apparatus includes a vertical aiming unit, which is provided on the rear side of the mounting module and is coupled to the headlamp housing, a horizontal aiming unit, which is provided on the rear side of the mounting module and is coupled to the headlamp housing, and a pivot unit which is coupled to the headlamp housing and is provided under the lower portion of the mounting module to support the mounting module and provide the center of the aiming operation.

15 Claims, 3 Drawing Sheets

APPARATUS FOR AIMING LED HEADLAMP

CROSS-REFERENCE TO RELATED APPLICATION

This application claims priority to and the benefit of Korean Patent Application No. 10-2007-0130999 filed in the Korean Intellectual Property Office on Dec. 14, 2007, the entire contents of which is incorporated herein by reference.

BACKGROUND OF THE INVENTION

1. Field of the Invention

The present invention relates to an LED (light emitting diode) headlamp aiming apparatus, which is provided in a mounting module and is connected to a headlamp housing to aim the mounting module, which is provided with LEDs and is installed in the headlamp housing.

2. Description of the Related Art

Generally, bulbs have been used as headlamps for vehicles to provide light at night. However, recently, a lot of research on techniques for providing light using LEDs, which are semi-permanent and have high illumination performance, in place of using bulbs has been actively conducted.

Headlamps using LEDs have structures such that a mounting module provided with LEDs is installed in a headlamp housing. In detail, the LEDs are mounted to the mounting module, and a horizontal aiming unit, a vertical aiming unit and a pivot unit are provided in the mounting module to adjust the angle at which the mounting module is aimed. The mounting module is aimed with respect to the pivot unit upwards, downwards, leftwards or rightwards.

The pivot unit provides the rotation center for aiming the mounting module. Typically, the pivot unit has a ball type structure, into which a ball is fitted, the ball being disposed in a retainer that is provided in the mounting module. However, in the conventional techniques, when vibrations and impact are transmitted to the headlamp as the conditions in which the vehicle travels are poor, the ball may be undesirably removed from its original position. Furthermore, the weight of the mounting module using LEDs may be greater than that of a mounting module using a typical bulb. Here, in the conventional techniques, because the pivot unit is provided on the rear surface of the mounting module and is connected to the headlamp housing, there is a problem in that the pivot unit may not be able to support the weight of the mounting module.

In other words, in the case where the pivot unit is provided on the rear of the mounting module along with the aiming units, the pivot unit may not be able to support the weight of the mounting module or vibrations or impact transmitted to the vehicle, so that the ball is removed from the retainer, or the retainer may be damaged. In this case, the operation of adjusting the angle at which the headlamp is aimed becomes impossible, and a problem in which the light of the headlamp shakes according to the conditions of a road surface is induced, thus reducing the traveling stability of the vehicle. In addition, there is a disadvantage of reduced durability.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, the present invention has been made keeping in mind the above problems occurring in the prior art, and an object of the present invention is to provide an LED headlamp aiming apparatus which improves the installation position of a pivot unit of a mounting module provided with LEDs, such that the pivot unit can absorb the weight of the mounting module and vibrations that are transmitted to a vehicle, thus improving the ability to aim the headlamp, the stability of the aiming operation and the durability of the headlamp.

In order to accomplish the above object, the present invention provides an LED headlamp aiming apparatus, including: a vertical aiming unit provided on a rear side of the mounting module and coupled to the headlamp housing; a horizontal aiming unit provided on the rear side of the mounting module and coupled to the headlamp housing; and a pivot unit provided under a lower portion of the mounting module to support the mounting module and provide a center of an aiming operation, the pivot unit being coupled to the headlamp housing.

The pivot unit may be disposed adjacent to the center of gravity of the mounting module. The pivot unit may have a ball type structure and include: a ball inserted into an insert seat formed in the headlamp housing; and a pivot cover provided ahead of the ball to surround and support the ball in conjunction with the insert seat.

Furthermore, the horizontal aiming unit may be provided in a lower end of the rear side of the mounting module, and the vertical aiming unit may be provided in an upper end of the rear side of the mounting module.

The mounting module may comprise a low beam unit and a high beam unit, and the horizontal aiming unit may be provided in the low beam unit at a position adjacent to the high beam unit.

In another exemplary embodiment of the present invention, an LED (light emitting diode) headlamp aiming apparatus for aiming a mounting module, which is provided with an LED and is installed in a headlamp housing, may comprise: a high beam unit; a low beam unit including at least a lighting unit coupled to the high beam unit by a single support panel; at least a mounting bracket supporting the low beam unit; a vertical aiming unit, provided on a rear side of the mounting module and coupled to the mounting bracket and the headlamp housing; a horizontal aiming unit provided on the rear side of the mounting module and coupled to the mounting bracket and the headlamp housing; and a pivot unit provided under a lower portion of the mounting module to support the mounting module in a balanced state and provide a rotation center of an aiming operation, the pivot unit being coupled to the headlamp housing, wherein a center of gravity of the mounting module is positioned substantially at or above the pivot unit in a vertical direction.

The horizontal aiming unit may be provided in the low beam unit positioned adjacent to the high beam unit with a first predetermined distance from the pivot unit and biased from the pivot unit with a second predetermined distance in vertical direction.

The vertical aiming unit may be positioned opposite to the horizontal aiming unit with respect to the pivot unit with a third predetermined distance and biased from the pivot unit with a fourth predetermined distance in vertical direction.

The pivot unit may have a ball type structure and comprises: a ball inserted into an insert seat formed in the headlamp housing; and a pivot cover provided ahead of the ball to surround and support the ball in conjunction with the insert seat.

The second predetermined distance of the horizontal aiming unit may be smaller than the fourth predetermined distance of the vertical aiming unit.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIGS. 1A and 1B are views showing a mounting module provided with an apparatus for aiming an LED headlamp, according to an embodiment of the present invention, in which:

FIG. 1A is a front perspective view; and

FIG. 1B is a rear perspective view;

FIGS. 2A and 2B are views showing the installation of the mounting module, provided with the LED headlamp aiming apparatus of FIGS. 1A and 1B, in a headlamp housing, in which:

FIG. 2A is a front perspective view; and

FIG. 2B is a rear perspective view; and

Figure 1A:
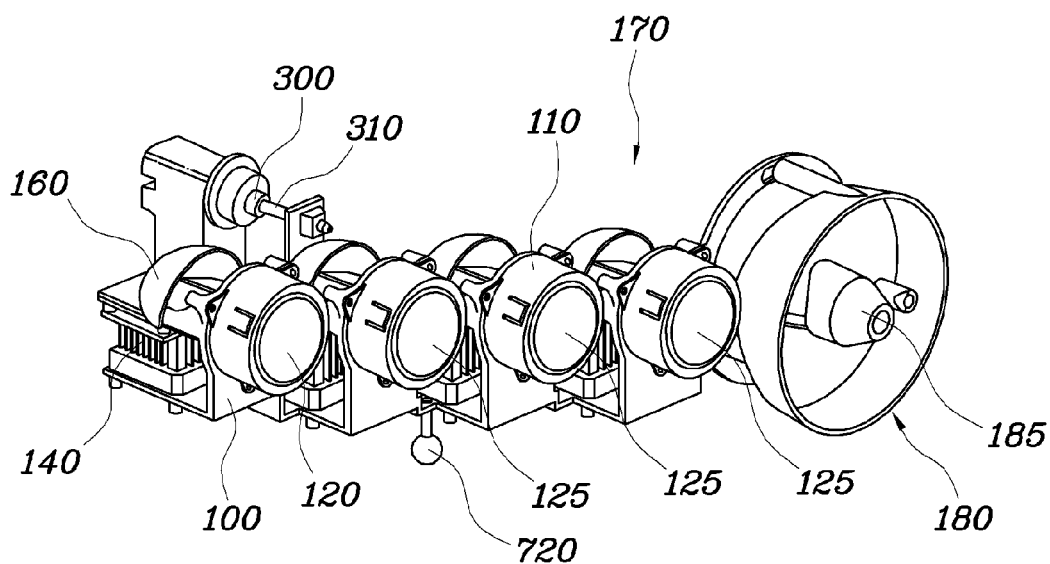

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

An apparatus for aiming an LED (light emitting diode) headlamp according to a preferred embodiment of the present invention will be described in detail with reference to the attached drawings.

Figure 1B:
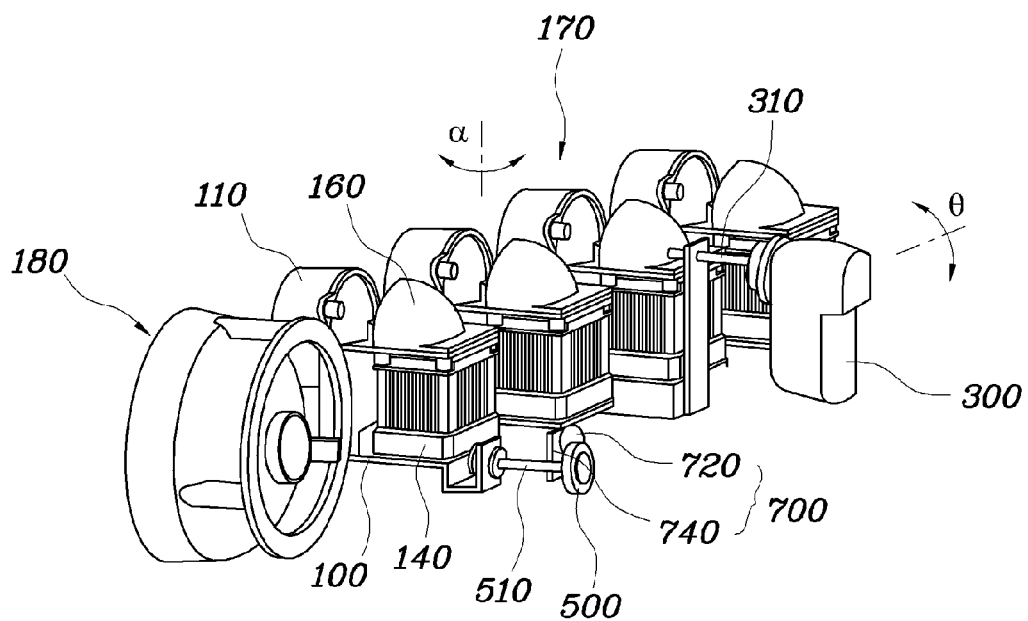
Figure 2A:
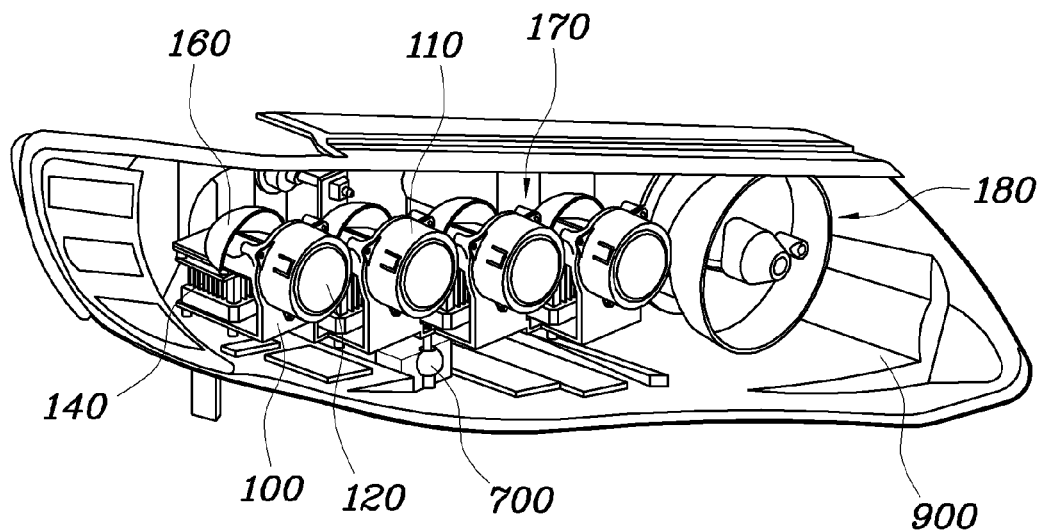
Figure 2B:
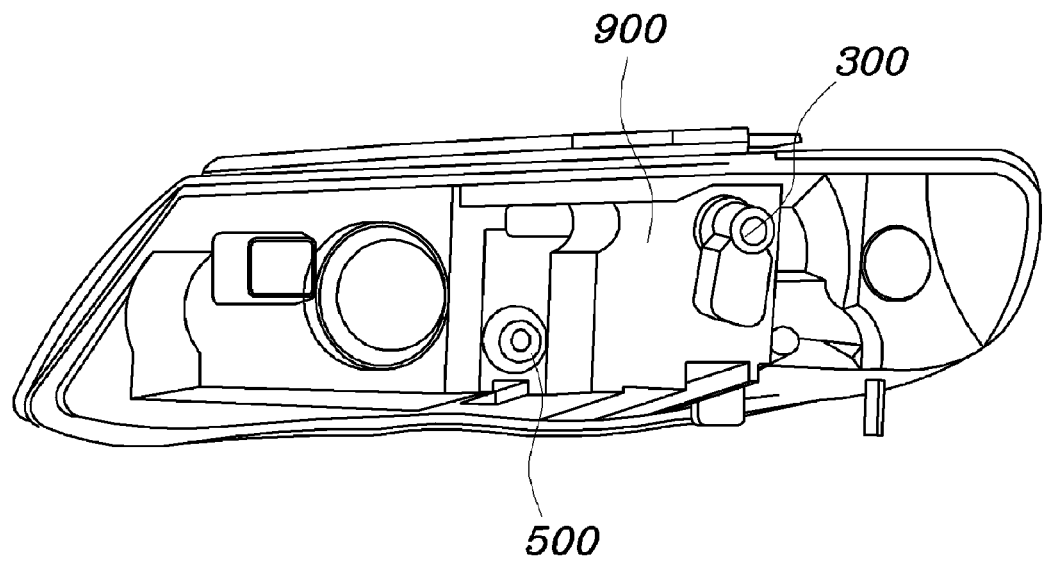

FIGS. 1A and 1B are perspective views illustrating a mounting module provided with the LED headlamp aiming apparatus and a headlamp housing wherein the mounting module is coupled to the headlamp housing in accordance with the present invention. FIGS. 2A and 2B are perspective views illustrating the mounting module installed in the headlamp housing.

The mounting module will be first explained with reference to FIG. 1A.

The mounting module includes a mounting bracket 100, a low beam unit 170 and a high beam unit 180, which are supported on a single support panel (not shown).

The low beam unit 170 includes a plurality of lighting units, which are arranged in a row. Each lighting unit of low beam unit 170 includes a support base 130, which supports an LED 125 thereon, a heat sink 140 for dissipating heat occurring from the lighting unit, an aspheric lens 120, which is disposed ahead of the LED, a case 110 retaining the aspheric lens 120, and a reflection surface 160, which is disposed behind the LED.

The mounting bracket 100 is positioned at lower side of the low beam unit 170 and thus supports the low beam unit 170 upwards.

Referring to FIG. 1B showing the rear perspective view of the mounting module, the LED headlamp aiming apparatus of the present invention serves to aim the mounting module provided with the LEDs with yaw rotation ($\alpha$) and pitch rotation ($\theta$).

The yaw rotation ($\alpha$) is to rotate the mounting module in left or right direction, which requires a yaw moment. The pitch rotation ($\theta$) is to rotate the mounting module in forward or backward direction, which requires a pitch moment.

For the pitch rotation ($\theta$) and the yaw rotation ($\alpha$), the mounting module of LED headlamp aiming apparatus further includes vertical aiming unit 300, horizontal aiming unit 500 and pivot unit 700.

The horizontal aiming unit 500 for the yaw rotation ($\alpha$) of the mounting module and the vertical aiming unit 300 for the pitch rotation ($\theta$) of the mounting module are provided on the rear side of the mounting module and coupled to the headlamp housing 900 respectively for simple construction of the aiming apparatus.

The horizontal aiming unit 500 is preferably installed at the mounting bracket 100 of the low beam unit 170 positioned adjacent to the high beam unit 180 with a predetermined distance with respect to the pivot unit 700 in consideration of the weight distribution of the mounting module since the higher beam unit includes a bulb 185 as shown in FIG. 1A and thus the size and weight of the high beam unit 180 are typically greater than those of the low beam unit 170 and thus the center of gravity of the mounting module is positioned near to the high beam unit 180.

The pivot unit 700, therefore, is positioned substantially at the center of gravity of the mounting module in the longitudinal direction.

The vertical aiming unit 300 is preferably disposed opposite to the high beam unit 180 with a predetermined distance with respect to the pivot unit 700 to provide stable counterbalance to the mounting module in consideration of the weight distribution of the mounting module.

Hence, left and right portions of the mounting module is sufficiently balanced with respect to the pivot unit 700 enough to support reliably the weight of the mounting module and effectively reduce moment applied from external environment. This well-balanced configuration absorbs vibrations and impact of the vehicle and thus enhance the stability with which the headlamp is aimed.

Further since the horizontal aiming unit 500 is biased with predetermined distance from the pivot unit 700 in a longitudinal direction of the mounting module, the horizontal aiming unit 500 could provide yaw moment to the mounting module.

The horizontal aiming unit 500 may include a threaded rod 510 and a controller (not shown) controls the longitudinal displacement of the threaded rod 510 to provide a yaw rotation (α).

However, referring to FIG. 2B in the vertical direction, the pivot unit 700 may be positioned under the lower portion of the mounting bracket 100. That is to say, the horizontal aiming unit 500 may be positioned substantially near to or above pivot unit 700 and preferably in the lower end of the rear side of the mounting module and the vertical aiming unit 300 may be positioned above pivot unit 700 and preferably in the upper end of the rear side of the mounting module as explained hereinafter.

In accordance with this configuration, the center of gravity of the mounting module is positioned near to or above the center of rotation, i.e., the pivot unit 700 and hence the pitch rotation (θ) of the mounting module is more effectively accomplished.

For this purpose, the horizontal aiming unit 500 is positioned with a predetermined distance above the pivot unit 700 in a vertical direction.

The vertical aiming unit 300 also is mounted to upper side of the mounting module with a predetermined distance from the pivot unit 700.

In particular, the predetermined distance of the vertical aiming unit 300 is larger than the predetermined distance of the horizontal aiming unit 500 to provide pitch moment with respect to rotation center of the mounting module effectively by the vertical aiming unit 300.

In other words, since the vertical aiming unit 300 is biased with the larger predetermined distance than the predetermined distance of the horizontal aiming unit 500 from the center of rotation, i.e., the pivot unit 700, of the mounting module in vertical direction, the vertical aiming unit 300 mainly provide pitch moment to the mounting module.

The vertical aiming unit 300 may include a threaded rod 310 and a controller (not shown) controls the longitudinal displacement of the threaded rod 310 to provide a pitch rotation.

Figure 3:
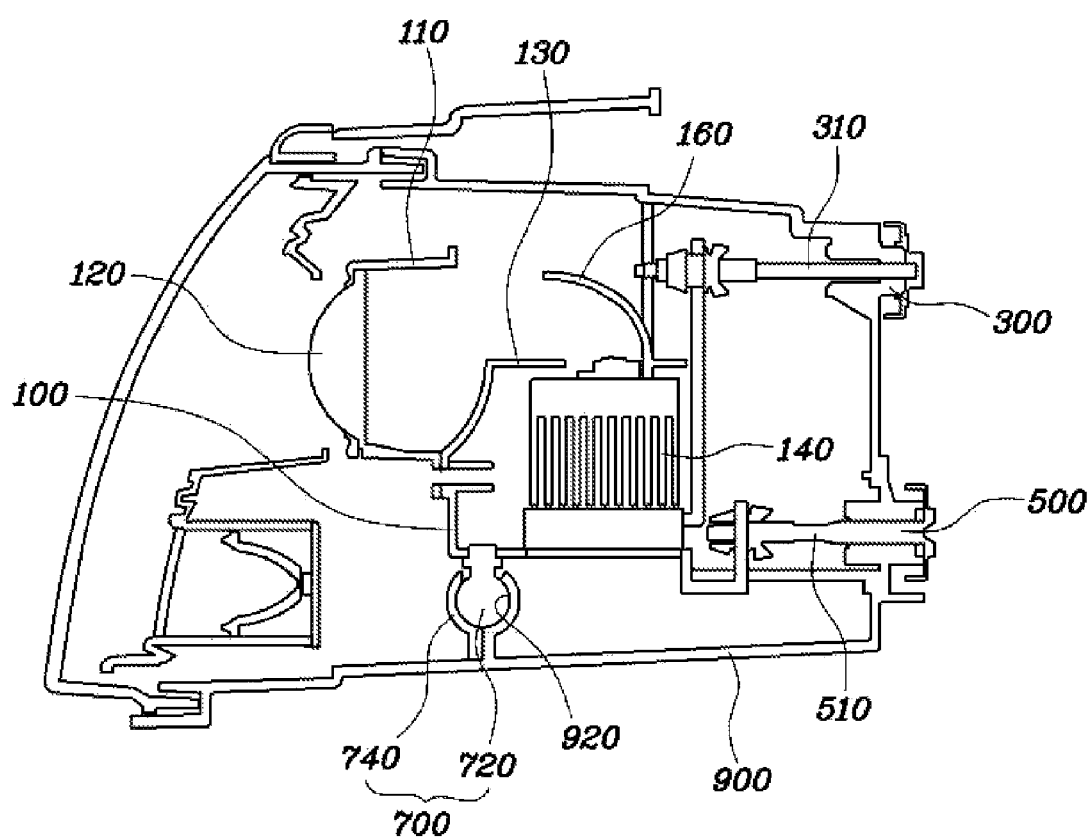
FIG. 3 is a sectional view showing the installation of the mounting module, provided with the LED headlamp aiming apparatus of FIGS. 1A and 1B, in the headlamp housing.

FIG. 3 is a sectional view showing the installation of the mounting module, provided with the LED headlamp aiming apparatus of FIGS. 1A and 1B, in the headlamp housing.

Referring to FIGS. 2A and 3, the pivot unit 700 has a ball type structure and includes a ball 720, an insert seat 920, and a pivot cover 740.

The insert seat 920 and the pivot cover 740 are formed in a lower portion of the headlamp housing 900 to receive the ball 720, wherein the pivot cover 740 is disposed ahead of the ball 720.

The ball 720 is coupled to the lower portion of the mounting bracket 100 and is complementarily inserted between the insert seat 920 and the pivot cover 740 to surround and support the ball 720.

The pivot unit 700 is assembled through a method in which the ball 720 is inserted into the insert seat 920 and the pivot cover 740 is coupled thereto, thus making the processes of mounting the pivot unit 700 to the aiming apparatus and removing it therefrom easy.

Furthermore, because the ball 720 of the pivot unit 700 is stably and rotatably positioned between the pivot cover 740 and the insert seat 920, the aiming operation can be effectively conducted.

As described above, the present invention provides an apparatus for aiming an LED headlamp, in which a pivot unit for providing the center of the aiming operation of a mounting module is disposed under the lower portion of the mounting module at the center of gravity of the mounting module in the longitudinal direction of the mounting module, thus stably supporting the weight of the mounting module, and precisely controlling the angle at which the mounting module is aimed.

Furthermore, the present invention is provided with an insert seat and a pivot cover, so that the processes of fitting the mounting module to the headlamp housing and removing it therefrom can be easily conducted.

In addition, in the present invention, aiming units are disposed at appropriate positions, which enable the aiming operation, performed in conjunction with the pivot unit, to be effectively and stably conducted.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An LED (light emitting diode) headlamp aiming apparatus for aiming a mounting module, which is installed in a headlamp housing, comprising:
   a plurality of LED lamps which are arranged in a row in the horizontal direction for being used as a low beam unit of the head lamp;
   a bulb lamp which is arranged beside an outmost LED lamp among the plurality of LED lamps for being used as a high beam unit for the headlamp;
   a vertical aiming unit provided on a rear side of the mounting module and coupled to the headlamp housing;
   a horizontal aiming unit provided on the rear side of the mounting module and coupled to the headlamp housing; and
   a pivot unit provided under a lower portion of the mounting module to support the mounting module and provide a rotation center of an aiming operation, the pivot unit being coupled to the headlamp housing,
   wherein the vertical aiming unit is positioned opposite to the horizontal aiming unit with respect to the pivot unit in a horizontal direction with a predetermined distance from the pivot unit.

2. The LED headlamp aiming apparatus as set forth in claim 1, wherein the pivot unit is disposed adjacent to a center of gravity of the mounting module.

3. The LED headlamp aiming apparatus as set forth in claim 2, wherein the pivot unit has a ball type structure and comprises:
   a ball inserted into an insert seat formed in the headlamp housing, wherein the insert seat is in arch-shape opened in a forward direction; and
   a pivot cover provided ahead of the ball and coupled to the insert seat to surround and support the ball in conjunction with the insert seat, wherein the pivot cover is in arch-shape opened in a rearward direction.

4. The LED headlamp aiming apparatus as set forth in claim 1, wherein the horizontal aiming unit is provided in a lower end of the rear side of the mounting module.

5. The LED headlamp aiming apparatus as set forth in claim 1, wherein the vertical aiming unit is provided in an upper end of the rear side of the mounting module.

6. The LED headlamp aiming apparatus as set forth in claim 1, wherein the mounting module further comprises a low beam unit and a high beam unit, and the horizontal aiming unit is provided in the low beam unit at a position adjacent to the high beam unit.

7. An LED (light emitting diode) headlamp aiming apparatus for aiming a mounting module, which is installed in a headlamp housing, comprising:
a plurality of LED lamps which are arranged in a row in the horizontal direction for being used as a low beam unit of the head lamp;
a bulb lamp which is arranged beside an outmost LED lamp among the plurality of LED lamps for being used as a high beam unit for the headlamp;
a vertical aiming unit provided on a rear side of the mounting module and coupled to the headlamp housing;
a horizontal aiming unit provided on the rear side of the mounting module and coupled to the headlamp housing; and
a pivot unit provided under a lower portion of the mounting module to support the mounting module and provide a center of an aiming operation, the pivot unit being coupled to the headlamp housing,
wherein the pivot unit is disposed adjacent to a center of gravity of the mounting module, and
wherein the vertical aiming unit is positioned opposite to the horizontal aiming unit with respect to the pivot unit in a horizontal direction with a predetermined distance from the pivot unit.

8. The LED headlamp aiming apparatus as set forth in claim 7, wherein the pivot unit has a ball type structure and comprises: a ball inserted into an insert seat formed in the headlamp housing; and a pivot cover provided ahead of the ball to surround and support the ball in conjunction with the insert seat.

9. The LED headlamp aiming apparatus as set forth in claim 8, wherein the horizontal aiming unit is provided in a lower end of the rear side of the mounting module.

10. The LED headlamp aiming apparatus as set forth in claim 8, wherein the vertical aiming unit is provided in an upper end of the rear side of the mounting module.

11. The LED headlamp aiming apparatus as set forth in claim 8, wherein the mounting module further comprises a low beam unit and a high beam unit, and the horizontal aiming unit is provided in the low beam unit at a position adjacent to the high beam unit.

12. An LED (light emitting diode) headlamp aiming apparatus for aiming a mounting module, which is installed in a headlamp housing, comprising:
a high beam unit including a bulb lamp;
a low beam unit including a plurality of LED lamps which are arranged in a row in the horizontal direction, and coupled to the high beam unit by a single support panel;
at least a mounting bracket supporting the low beam unit;
a vertical aiming unit, provided on a rear side of the mounting module and coupled to the mounting bracket and the headlamp housing;
a horizontal aiming unit provided on the rear side of the mounting module and coupled to the mounting bracket and the headlamp housing; and
a pivot unit provided under a lower portion of the mounting module to support the mounting module in a balanced state and provide a rotation center of an aiming operation, the pivot unit being coupled to the headlamp housing,
wherein a center of gravity of the mounting module is positioned substantially at or above the pivot unit in a vertical direction,
wherein the vertical aiming unit is positioned opposite to the horizontal aiming unit with respect to the pivot unit in a horizontal direction with a first predetermined distance from the pivot unit, and
wherein the pivot unit has a ball type structure and comprises: a ball inserted into an insert seat formed in the headlamp housing, wherein the insert seat is in arch-shape opened in a forward direction; and a pivot cover provided ahead of the ball and coupled to the insert seat to surround and support the ball in conjunction with the insert seat, wherein the pivot cover is in arch-shape opened in a rearward direction.

13. The LED headlamp aiming apparatus as set forth in claim 12, wherein the horizontal aiming unit is provided in the low beam unit positioned adjacent to the high beam unit with a second predetermined distance from the pivot unit and biased from the pivot unit with a third predetermined distance in vertical direction.

14. The LED headlamp aiming apparatus as set forth in claim 12, wherein the vertical aiming unit is biased from the pivot unit with a fourth predetermined distance in vertical direction.

15. The LED headlamp aiming apparatus as set forth in claim 12, wherein the second predetermined distance of the horizontal aiming unit is smaller than the fourth predetermined distance of the vertical aiming unit.

* * * * *